Figure 1:
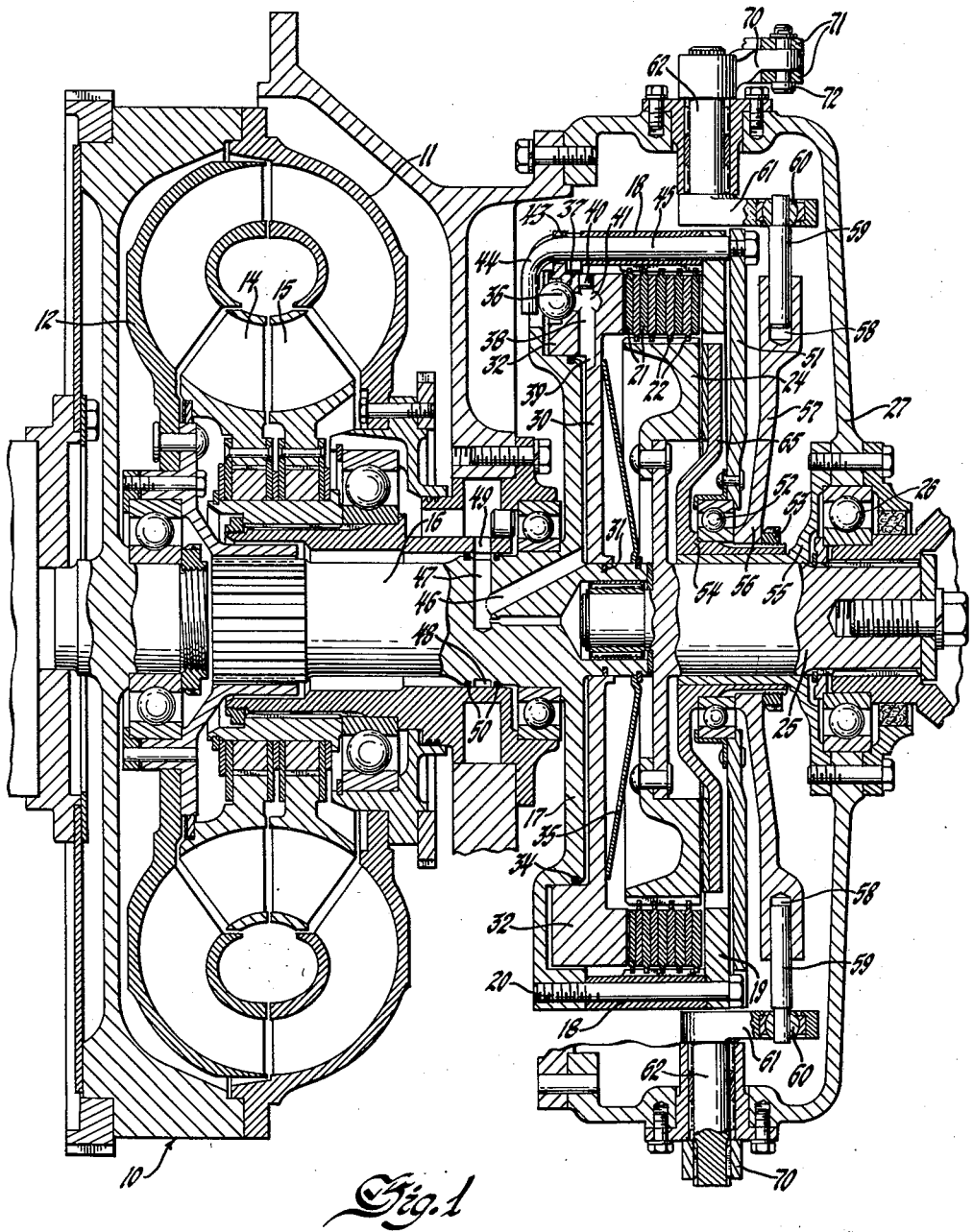

United States Patent Office 2,808,138
Patented Oct. 1, 1957

2,808,138

MANUALLY CONTROLLED HYDRAULICALLY OPERATED CLUTCHES

Howard W. Christenson, Indianapolis, Ind., assignor to General Motors Corporation, Detroit, Mich., a corporation of Delaware Application October 14, 1952, Serial No. 314,629

20 Claims. (Cl. 192—12)

This invention relates to improvements in clutches and more particularly to improvements in manually controlled hydraulically operated clutches especially adapted for heavy duty use.

In heavy vehicles such as tractors for trailers, trucks, bulldozers and the like, hydraulic clutches have been provided with manual controls for starting and stopping the vehicle at the will of the operator. In the operation of many known arrangements, it has been difficult, if not impossible, to stop the vehicle at a precise point, and an equally great objection is found in the harshness of clutch engagement. The latter condition is due to abrupt application of fluid under considerable pressure to the clutch actuator, such abrupt application of fluid being caused, for example, by the valve action in which a valve is either fully open or fully closed. Operator "feel," which is experienced in slipping a non-hydraulic clutch, is absent from these known arrangements and it is apparent that operator "feel" is extremely important for some functions, such as inching along a vehicle, starting movement of the same smoothly and without jerks, etc.

An object of the present invention is to provide a new type of hydraulic clutch which can be manually controlled so that the engagement of the clutch elements can be accomplished by the operator with a nicety of "feel" that approaches the quality of clutch engagement found in conventional manually operated non-hydraulic clutches.

Another object of the invention is to provide a clutch in which fluid for operating the same is supplied to the clutch piston constantly but which is prevented from actuating the clutch except when the operator so desires.

Another object of the invention is to provide a clutch in which the fluid actuated piston is supplied with a valve or valves near the periphery thereof which can be opened or closed manually at the will of the operator for releasing or engaging the clutch.

A further object of the invention is to provide a clutch as before described in which the valve actuator or actuators are carried by a hub member which can have longitudinal movement imparted thereto for operating the valve or valves.

An additional object of the invention is to provide a clutch in accordance with the foregoing in which the hub carrying the valve actuator or actuators also supports a brake member which can be brought into braking relation to a part of the driven clutch device for slowing the same when the valve is in open condition.

A further object of the invention is to provide the brake carrying hub with rotary motion in addition to longitudinal motion which rotary motion of the brake is in the direction of rotation of the driven element so that the brake in itself has a self-energizing action.

A still further object of the invention is to provide a clutch as before described with manual operating mechanism which can function to engage the clutch in the absence of hydraulic pressure.

In carrying out the foregoing and other objects of the invention a clutch for accomplishing the same is made up of driving and driven clutch elements which may be discs or other conventional constructions. The driving elements preferably are carried by a rotatable drum which has mounted therewithin an annular piston movable to force the driving elements into contact with the driven elements which in turn are attached to or carried by an output shaft. This shaft can be attached to any well-known type of change speed transmission. Oil or other fluid is supplied constantly to the piston which is spring biased to hold the elements in disengaged condition. In order that the supplied fluid can be prevented from causing engagement of the clutch, the piston is provided with one or more valves, preferably of the ball type, near the periphery thereof which ball valves when open vent the fluid to the exterior of the drum through suitable openings therein.

In order that each such valve can be manually controlled, the ball thereof is held captive by a rod passing through or supported by the rim of the drum, such rod having an angular bent end resting in a slot of the wall of the drum and engaging and restraining the ball from extreme separation from its seat. The operating rods are attached to a plate rotatably mounted on a hub which surrounds the driven power shaft and which can be moved both longitudinally of this shaft and angularly thereabout. The hub in turn can be so moved through the agency of one of several cranks pivotally mounted in the casing which encloses the clutch. An over center linkage outside the casing can be manually operated to impart longitudinal movement to the hub and thereby to the clutch for controlling valve action.

In addition, the hub serves to carry brake elements or shoes which can be brought into engagement with a brake disc intermediate the output shaft and the driven clutch elements by longitudinal movement of the hub in one direction. This braking action can be manually applied through the same linkage that controls valve operation. If desired the brake shoe or shoes in addition to the longitudinal movement can have imparted thereto an angular movement in the direction of rotation of the brake disc so that engagement of these brake elements results in a self-energizing brake action.

The operating linkage before mentioned is of such character that an operator can apply sufficient pressure to the valves and through them to the clutch elements as to engage these elements, in the absence of operating fluid, to a degree which will permit a push start of the engine of the vehicle in which the clutch is mounted.

Figure 2:
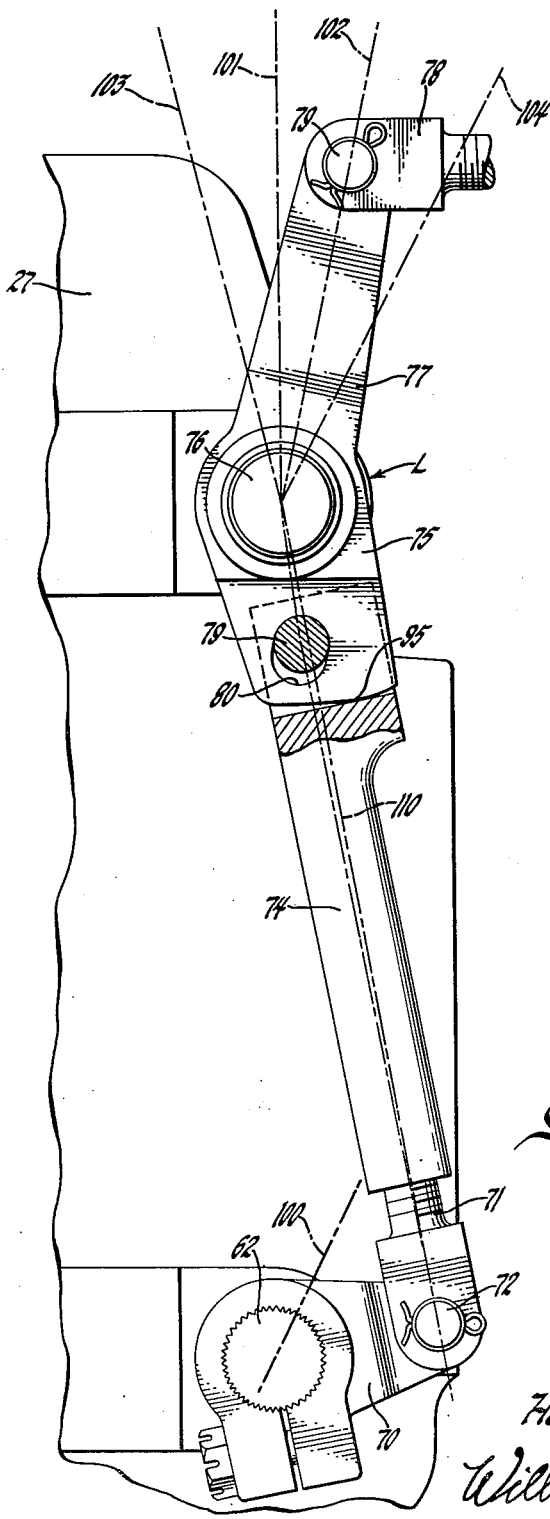

Other features, objects and advantages of the invention will become apparent by reference to the following detailed description of the accompanying drawings illustrating the same, wherein, Figure 1 is an irregular vertical section through a part of a construction employing the invention, and Figure 2 is a plan view of the over center linkage employed in the manual operation of the clutch.

Referring now to the drawings and particularly to Figure 1, 10 indicates generally the flywheel of a prime mover, such as an internal combustion engine or the like, to which flywheel is secured the pump 11 of a torque converter having a turbine 12 and free wheeling stators 14 and 15, all of conventional type and forming no particular part of this invention. The turbine 12 is connected to a shaft 16 which will be described as the driving shaft since it performs that function in connection with the clutch of this invention. Shaft 16 has integral therewith or connected thereto in any suitable manner the side plate 17 of a drum which has a rim 18 and an opposite partial side plate 19. The rim 18 and the partial side plate 19 are connected to the plate 17 by a plurality of bolts 20 threaded to plate 17 as shown near the bottom of the view. The drum so formed by these three elements serves to retain the component parts of the new clutch involved in this invention. Consequently, a plurality of drive plates or discs 21 are splined to the inner surface of rim 18 while a cooperating series of clutch plates or discs 22 are splined to an annulus 24 which in turn is connected as shown or in any other suitable fashion to a shaft 25 which will be termed the driven shaft hereinafter. Shaft 25 is mounted for rotation through suitable antifriction bearings 26 in a part of the enclosing casing 27. The outer end of shaft 25 can be secured to a conventional change speed gear or other type of transmission.

An annular piston 30 is mounted in the drum for rotation therewith and for longitudinal movement relative to the reduced diameter end portion of the shaft 16. An oil seal 31 prevents leakage of fluid between the piston and the shaft portion 16. The outer part of piston 30 is enlarged as shown at 32 to fit in an offset part of plate 17 and a seal 34 prevents leakage between the piston and a surface of the offset part of this plate. A plurality of spring fingers 35 rotating with shaft 16 urge the piston toward the clutch-release position.

Enlargement 32 of the piston is of sufficient size to permit the installation therein of one or more valves of the ball type, only one of which will be described, and each of which comprises a ball 36 which can rest against a tapered surface 37 formed in the enlargement 32. Adjacent the ball 36 is a radial channel 38 which can be drilled in the piston and so located as to provide an opening 39 into the space between the piston and the plate 17. A plug 40 closes the end of the channel. A cross channel 41 leads from channel 38 to the opening formed in enlargement 32 by the process of making the valve seat. Ball 36 is held captive by a finger 44 on the end of a rod 45 which extends through the rim 18 of the drum. Finger 44 as shown in the drawings is positioned in a recess cut in plate 17 and the piston has multiple drive spider arms 43, one of which extends partially into this same recess so that the piston spider arm will engage either wall of the recess should there be a slippage between the drum and the piston with the result that rotation of the piston with the drum is assured. Fluid is supplied from the driving shaft to the space between piston 30 and the plate 17 through an angular channel 46 leading to a radial channel 47 which in turn communicates with a peripheral groove 48 in shaft 16. Groove 48 communicates with a passage 49 which can be in communication with a pump, not shown and preferably mounted outside the casing enveloping the clutch. Seals 50 prevent leakage from this groove 48 along shaft 16. The pump can be of any conventional type which supplies fluid constantly, the maximum pressure of which is determined by a relief valve in the pump structure.

The rod 45 has the end thereof opposite finger 44 secured to a plate 51 which plate is centrally apertured and is mounted for rotation (being in effect attached to the drum) through antifriction bearing 52 about a hub 54. Hub 54 in turn surrounds a sleeve 55 attached to the casing 27 and is capable both of longitudinal movement relative to the sleeve, and consequently shaft 25, and also rotation about this sleeve. These two types of motion can be effected manually through the following connections. A ring 56 is splined or keyed to the hub as shown and is held in assembly with the hub and the antifriction bearings by a threaded collar 53. Ring 56 has two spokes 57 extending radially therefrom, each spoke terminating in an enlargement bored to provide a cylinder 58 in which is snugly mounted a rod or piston 59. The upper end of rod 59 is mounted in a socket connection 60 in an end of a crank arm 61 attached to a crankshaft 62 mounted for rotation relative to and extending through the casing 27. The upper end of crankshaft 62 has secured thereto a linkage which will be described later.

Integral with hub 54, or secured thereto, are carriers 65 for brake shoes which can be either in the form of a single disc-like member or can be in the form of a plurality of sections of such member. For this reason the carrier 65 can be either a solid angular formed plate or may be in the nature of a plurality of spokes, but for purposes of rigidity the solid formation is preferred. The brake shoe or shoes carried by member 65 are adapted to engage the disc-like surface of annulus 24.

While one of the crankshafts 62 has been described previously as having operating linkage connected thereto, it is to be understood that a number of such shafts are provided about the clutch drum, preferably such shafts being two in number, and consequently the spokes 57 and accompanying members are also two in number. In practice it has been found that operation of a single one of the shafts by suitable linkage will be sufficient to impart the desired polar rotation motion to the hub 54, the remaining crankshafts and associated parts serving to add stability to the assembly.

In Figure 2 an over center type of linkage has been shown. An arm 70 is fastened about the outer end of shaft 62 and has pivotally attached thereto a threaded rod 71 which has its end forked to receive the end of this arm. A pin 72 holds these parts together. Rod 71 is internally threaded into a second rod 74, the upper end of which is forked to receive one end 75 of a lever L pivoted about a shaft 76 fastened at some suitable point on the casing 27. The other end of lever L extends outwardly as at 77 and has attached thereto an operating member 78. Part 75 of the lever is held between the tines of the forked end of rod 74 by a pin 79 which extends through these tines with a snug fit and through an opening in part 75 which opening is enlarged as shown at 80. The threaded connection between rods 71 and 74 permits the total length of this compound rod to be varied for adjustment of the linkage, especially to compensate for wear.

While the crank arms 61 have been shown partially in section, it is to be understood that each thereof extends at such an angle from the plane of the paper and is of such length that a very small degree of rotation of a crankshaft 62 will impart to its connected arm the desired motion along an arc which will result in movement of the hub 54 axially of the shaft 25 a distance necessary to cause either engagement or release of the clutch or to cause braking of the clutch elements when the valve is open. In Figure 1 the upper crank arm 61 actually extends angularly to the rear of the plane of the paper while the lower crank arm extends angularly forward of the plane of the paper. The other arms not shown and spaced at 90° about shaft 25 extend at the same angularity and in the same direction about this shaft. For example, in Figure 2 the line 100 indicates the angle at which upper crank arm 61 extends relative to the axis of the crankshaft 62. It will be apparent that this angular disposition and the length of the crank arms can be chosen to obtain the desired longitudinal movement of hub 54 for a given degree of rotation of crankshaft 62.

Bearing these relations in mind, the following operation of the mechanism can readily be traced. Let it be assumed that line 101 represents the neutral or disengaged clutch position; line 102 the fully engaged clutch position, line 103 braking position and line 104 the push-start position. If the lever arm 77 is so positioned that the line between the centers of the pins 76 and 79 coincide with line 101, the position of the lever arm 75 and the compound rod 71, 74 will be such that hub 54 has been moved to the left (Figure 1) sufficiently to permit springs 35 to force piston 30 substantially against plate 17 and plate 51 will be moved still further relative to piston 30 causing finger 44 to move to the left sufficiently for the ball 36 to roll off its seat. This is the neutral or disengaged condition of the clutch at which time fluid being supplied thereto from an external pump through channels 49, 48, 47, and 46 will pass between piston 30 and plate 17 into the end 39 of channel 38 and out of the piston enlargement through opening 41 to be vented outside of the drum through the opening therein in which finger 44 is positioned. Since the ball 36 offers no resistance to flow of fluid from the piston it follows that sufficient pressure cannot be developed to impart any appreciable degree of movement to the piston 30.

Should the operating lever be moved from the 101 to the 102 position which is that illustrated in Figure 2, the result will be to impart clockwise rotation to the crankshaft 62 which in turn will impart clockwise rotation to the crank arm 61. The latter rotation through a small arc causes a compound motion of the spoke 57 to the extent that this spoke is moved both longitudinally and rotatably relative to shaft 25 and since spoke 57 and ring 56 are splined to hub 54 the same motion is imparted to this hub. The provision of the piston 59 fitting snugly in cylinder 58 and the ball socket joint 60 makes possible this combined rotary and longitudinal motion. The longitudinal motion of hub 54 causes a similar motion of the plate 51 and consequently finger 44 and the direction of this motion is to the right in Figure 1. This longitudinal motion, as determined by the angularity of the crank arm and the length thereof relative to the degree of rotation of the crankshaft, is of such an extent as to cause seating of ball 36 on its seat 37, which immediately prevents venting of the fluid through this valve with the result that the fluid builds up pressure behind piston 30 moving the same to the right and forcing the clutch discs one against another and against side plate 19 to engage the clutch to drive shaft 25. A very short travel of piston 30 will accomplish clutch engagement.

When the linkage of Figure 2 is in the position shown it will be apparent that the center of pin 79 is to the left of the line 110 connecting the centers of pins 72 and 76, or, in other words, the parts 71, 74, and 75 constitute an over center linkage. Due to this arrangement any reaction force which would tend to move the crankshaft 62 in a counterclockwise direction would tend to move the pin 79 further to the left. However, such additional motion is effectively arrested by the cam formation 95 on the end of the lever part 75 which will bear against the bottom of the surface between the tines of the fork at the end of member 74. In fact, if forces of reaction could operate to cause such counterclockwise motion of shaft 62, the result would be that the cam 95 would force the arm 74 an additional distance clockwise (permitted by the enlargement 80) in effect causing further clockwise rotation of shaft 62.

It is to be understood that the valve is closed after a small degree of movement of lever arm 77 from the 101 position and that the clutch is fully engaged before this lever arm reaches the 102 position. When the 102 position is reached the linkage is in over center condition, effectively locking the clutch engaged so that the operator may release his hand lever (not shown). During the movement from valve closed position to fully engaged clutch position the operator can "feel" the action of the clutch elements in becoming engaged, and can temper the engagement by so manipulating his hand lever that fluid pressure behind the piston will unseat the ball to such a slight degree as to allow some of the fluid to escape and thereby to relieve this pressure. In this manner slipping of the clutch can be achieved so that the vehicle can be inched along and sustained motion thereof can be initiated smoothly and without jerking. If the lever is jerked to the full on position the mechanical force is instantaneous and the oil boost completes the engagement through a one second interval, smoothing the torque shock to the coupled machinery.

Should the prime mover with which this mechanism is associated be in inoperative condition due to run-down battery or other causes, the clutch of this invention can be manually operated to permit a push start of the vehicle in which the mechanism is mounted. The operator, by moving the lever arm 77 to the 104 position, causes the cam 95 to force rod 71, 74 further clockwise to impart additional clockwise rotation to shaft 62, placing the mechanism associated with the crankshaft 62 under such stress that the rod 45 will be forced to the right (Fig. 1) under tension which will be sufficient to mechanically engage the clutch in the absence of supplied fluid. It has been estimated that a clutch engaging pressure in the neighborhood of from 1000 to 1500 pounds can be obtained in this fashion. With the clutch so closed and the vehicle in gear it can be pushed or pulled with the result that the torque converter acts as a fluid coupling causing the motor to be turned sufficiently for the starting thereof.

When it is desired to release the clutch the operator merely restores the linkage to the 101 position at which time shaft 62 is rotated counterclockwise moving crank arm 61 in the same direction and imparting longitudinal movement of the hub 54 and consequently plate 51, rod 45 and finger 44 to the left. Such motion of the finger permits unseating of ball 36 whereupon the fluid is almost instantaneously dumped from the drum, due to centrifugal force, so the clutch is immediately released. If the operator so desires, a braking action can be employed when the clutch has been released by moving the linkage to the 103 position which imparts further counterclockwise rotation to shaft 62 and the parts associated therewith. Such additional motion moves the hub both longitudinally and to a small degree in rotary fashion about the shaft 55 which combined motion causes the brake shoe or shoes mounted on the carrier 65 to engage the brake surface on the annulus 24. In the preferred form of the invention illustrated herein the rotary motion of the carrier 65 along with the hub 54 is in the same direction as that of the shaft 25 and annulus 24 so that as the brake elements become engaged the result is that a self-energizing brake is created due to the leverage and linkage employed.

In actual practice it has been found that the clutch of this invention can be engaged with a very smooth action even though fluid for performing the actual closing is under considerable pressure. It is believed that this smooth action assisted the time interval required to entrap sufficient fluid between the piston and the drum as to force the clutch discs together and further that since these discs are usually well bathed in fluid the actual gripping takes effect progressively as all fluid is forced from between contacting surfaces. Furthermore, it has been found that the clutch can be released practically instantaneously so that a vehicle equipped with such a device can be maneuvered very readily, can be advanced or reversed for very short distances and can be stopped at any desired point in its travel. Of course, the vehicle service brakes must be equipped in addition to the clutch and its brake.

The construction of the clutch of this invention has been described as embodying a single valve for controlling fluid operation thereof; but it is to be understood that such description was for purposes of brevity only, since in practice a number of valves similar to that described will be employed with the valves spaced more or less equidistantly about the clutch piston adjacent its periphery.

From the foregoing it will be seen that this invention provides a new, simple, and efficient manually controlled hydraulically operated clutch. It is contemplated that changes can be made therein within the scope of the following claims.

What is claimed is:

1. In a clutch of the type described, a housing, driving and driven elements, a clutch actuator in said housing movable relative thereto under hydraulic pressure to engage said elements, and means carried by said clutch actuator for controlling the application of hydraulic pressure to said clutch actuator, manually operated mechanism for said means and for manually moving said clutch actuator to engage said elements.

2. In a clutch of the type described, a housing, driving and driven elements, a clutch actuator in said housing compelled to move with said driving elements, means for supplying fluid to said actuator to move said actuator relative to said housing, and valve means carried by said actuator for controlling the pressure of the fluid supplied to said actuator, manually operated mechanism for closing said valve and for moving said actuator in a direction to engage said elements.

3. In a clutch of the type described, a housing, rotatable driving and driven elements, a clutch actuator in said housing compelled to rotate with said driving elements, means for supplying fluid to said actuator to move said actuator relative to said housing, and valve means carried by said actuator near the periphery thereof for controlling the pressure of the supplied fluid, and manually operated mechanism for closing said valve means to cause engagement of said elements and for releasing said valve means to cause release of said elements.

4. In a clutch of the type described, a driving rotary drum carrying clutch elements, an output shaft carrying clutch elements, an annular piston mounted in said drum for rotation therewith, means for supplying fluid to said piston, valve means mounted in said piston adjacent the periphery of said piston for controlling the pressure of fluid supplied to said piston, and manually operated mechanism for closing and opening said valve to cause engagement and release of said elements.

5. In a clutch of the type described, a driving rotary drum carrying clutch elements, an output shaft carrying driven clutch elements, an annular piston mounted in said drum for rotation therewith, means for supplying fluid to said piston, valve means mounted in said piston adjacent the periphery of said piston for controlling the pressure of fluid supplied to said piston, and manually operated mechanism for closing and opening said valve to cause engagement and release of said elements, said mechanism having as part thereof over center linkage for keeping said valve closed as said piston moves in engaging said elements.

6. In a clutch as described in claim 5, the improvement comprising the linkage being movable to such a degree as to move said piston into position to cause engagement of the clutch elements in the absence of fluid supply.

7. In a clutch of the type described, a driving rotary drum carrying clutch elements, an output shaft carrying driven clutch elements, an annular piston mounted in said drum for rotation therewith, means for supplying fluid to said piston, valve means mounted in said piston adjacent the periphery of said piston for controlling the pressure of fluid supplied to said piston, and manually operated mechanism for closing and opening said valve to cause engagement and release of said elements, said mechanism including means for applying braking to said driven elements and said shaft when said valve is open.

8. In a clutch of the type described, a driving rotary drum carrying clutch elements, an output shaft carrying driven clutch elements, an annular piston mounted in said drum for rotation therewith and for movement toward and away from said clutch elements, means for supplying fluid constantly to said piston, valve means carried by said piston adjacent the periphery thereof, said valve means when open venting the supplied fluid outside said drum and when closed entrapping said fluid to move said piston for clutch element engagement, and mechanism for manually operating said valve.

9. In a clutch of the type described, a driving rotary drum carrying clutch elements, an output shaft carrying clutch elements, a brake for said shaft and the elements carried thereby, an annular piston mounted in said drum for rotation therewith and for movement toward and away from said clutch elements, means for supplying fluid to said piston, valve means carried by said piston adjacent the periphery thereof, said valve means when open venting the supplied fluid outside said drum and when closed entrapping said fluid to move said piston for clutch element engagement, and mechanism for manually operating said valve, and for applying braking to said shaft when the valve is open.

10. In a clutch of the type described, a driving rotary drum carrying clutch elements, an output shaft carrying driven clutch elements, an annular piston mounted in said drum for rotation therewith and for movement toward and away from said clutch elements, means for supplying fluid to said piston, ball valve means carried by said piston adjacent the periphery thereof, said valve means when open venting the supplied fluid outside said drum and when closed entrapping said fluid to move said piston for clutch element engagement, a valve control member carried by said drum and movable to seat and to release said valve, and mechanism for manually operating said control member to engage and release said clutch.

11. In a clutch as defined in claim 10 the improvement comprising the provision in said mechanism of linkage for keeping said valve closed as the piston moves into and maintains clutch engaging condition.

12. In a clutch of the type described, a driving rotary drum carrying clutch elements, an output shaft carrying driven clutch elements, an annular piston mounted in said drum for rotation therewith, means for supplying fluid to said piston, valve means mounted in said piston adjacent the periphery of said piston for controlling the pressure of fluid supplied to said piston, a hub mounted for longitudinal and angular motion relative to said shaft, a plate having a valve actuator secured thereto, said plate being mounted for compelled longitudinal movement with said hub and rotation relative thereto in unison with said drum, and manually operated mechanism for imparting motion to said hub and said plate to operate said valve.

13. In a clutch as defined in claim 12 the improvement comprising, a brake disc secured to said shaft, and a brake shoe secured to said hub, said mechanism being operable to apply said shoe to said disc when said valve is in open condition.

14. In a clutch as defined in claim 12 the improvement comprising, a brake disc secured to said shaft, and a brake shoe secured to said hub, said mechanism being operable when the valve is open to move said hub and brake shoe toward and in the direction of rotation of the disc to create a self-energizing brake action between the disc and the shoe.

15. In a clutch of the type described, a driving rotary drum carrying clutch elements, an output shaft carrying driven clutch elements, an annular piston mounted in said drum for rotation therewith and for movement toward and away from said clutch elements, means for supplying fluid to said piston, valve means carried by said piston adjacent the periphery thereof, said valve means when open venting the supplied fluid outside said drum and when closed entrapping said fluid to move said piston for clutch element engagement, a hub mounted for longitudinal motion relative to said shaft, a valve actuator carried by said drum and rotating therewith, said actuator being mounted for rotation relative to said hub and being compelled to move longitudinally therewith, and manually operated mechanism for moving said hub to open and close said valve.

16. In a clutch as defined in claim 15 the improvement comprising, a brake member secured to said shaft, a second brake member secured to said hub, said mechanism being operable to engage said brake members when the valve is in open condition.

17. In a clutch of the type described, a driving rotary drum carrying clutch elements, an output shaft carrying driven clutch elements, an annular piston mounted in said drum for rotation therewith, means for supplying fluid to said piston, valve means mounted in said piston adjacent the periphery of said piston, and manually operated mechanism for closing said valve to trap fluid behind said piston and thereby to cause engagement of said elements, said mechanism being movable to such a degree as to move said piston into position to cause engagement of the clutch elements in the absence of fluid supply.

18. In a clutch of the type described, a driving rotary drum carrying clutch elements, an output shaft carrying driven clutch elements, an annular piston mounted in said drum for rotation therewith and for movement toward and away from said clutch elements, means for supplying fluid to said piston, valve means carried by said piston adjacent the periphery thereof, said valve means when open venting the supplied fluid outside said drum and when closed entrapping said fluid to move said piston for clutch element engagement, a valve control member carried by said drum and movable to close and to open said valve, and mechanism for manually imparting movement to said control member to close said valve and for imparting further movement thereto in the same direction to move said valve and piston into clutch engaging position in the absence of fluid supply.

19. In a clutch of the type described, a driving rotary drum carrying clutch elements, an output shaft carrying driven clutch elements, an annular piston mounted in said drum for rotation therewith and for movement toward and away from said clutch elements, means for supplying fluid to said piston, ball valve means carried by said piston adjacent the periphery thereof, said valve means when open venting the supplied fluid outside said drum and when closed entrapping said fluid to move said piston for clutch element engagement, a valve control member carried by said drum and movable to seat and to release said ball, and linkage for manually imparting movement to said control member to seat said ball and keep said ball seated as the clutch elements are engaged, said linkage being of such character that the ball and piston can be moved by the control member into clutch engaging position in the absence of fluid supply.

20. In a clutch of the type described, a driving rotary drum carrying clutch elements, an output shaft carrying driven clutch elements, an annular piston mounted in said drum for rotation therewith and for movement toward and away from said clutch elements, means for supplying fluid to said piston, a valve seat in said piston adjacent the periphery thereof, a ball held in captive relation to said seat, said ball when unseated venting the supplied fluid outside said drum and when seated entrapping said fluid to move said piston for clutch element engagement, and mechanism for manually moving said ball against its seat with a continued force that can move the piston into clutch element engagement position in the absence of fluid supply.

References Cited in the file of this patent

UNITED STATES PATENTS

| | | |
|---|---|---|
| 1,805,081 | Drkal | May 12, 1931 |
| 1,946,062 | Cramp | Feb. 6, 1934 |
| 2,590,089 | Cook | Mar. 25, 1952 |